United States Patent [19]
Shida et al.

[11] Patent Number: 5,783,915
[45] Date of Patent: Jul. 21, 1998

[54] LINEAR ACTUATING APPARATUS

[75] Inventors: Satoshi Shida, Katano; Akira Kabeshita, Hirakata; Shinji Kanayama, Kashihara; Kenji Takahashi, Katano; Makoto Imanishi, Hirakata; Osamu Nakao, Osaka, all of Japan

[73] Assignee: Matsushita Electric Industrial Co., Ltd., Kadoma, Japan

[21] Appl. No.: 589,005

[22] Filed: Jan. 19, 1996

[30] Foreign Application Priority Data

Jan. 20, 1995 [JP] Japan .................. 7-007524
Jan. 31, 1995 [JP] Japan .................. 7-014102

[51] Int. Cl.⁶ .................. H02K 41/00; H02K 41/02
[52] U.S. Cl. .................. 318/135; 310/12
[58] Field of Search .................. 310/12, 13; 318/686, 318/687, 652, 135, 466, 467, 468, 469, 470

[56] References Cited

U.S. PATENT DOCUMENTS

| | | | |
|---|---|---|---|
| Re. 33,910 | 5/1992 | Compton | 318/135 |
| 3,548,273 | 12/1970 | Parodi et al. | 318/135 |
| 3,737,883 | 6/1973 | Sordello et al. | 318/687 |
| 4,665,348 | 5/1987 | Stupak, Jr. | 318/135 |
| 4,692,678 | 9/1987 | Lee | 318/135 |
| 5,440,183 | 8/1995 | Denne | 310/12 |
| 5,446,323 | 8/1995 | Neff et al. | 310/12 |
| 5,488,278 | 1/1996 | McGraw et al. | 318/135 |
| 5,515,599 | 5/1996 | Best | 29/705 |

*Primary Examiner*—Clayton E. LaBalle
*Attorney, Agent, or Firm*—Wenderoth, Lind & Ponack, L.L.P.

[57] ABSTRACT

A linear actuating apparatus includes a shaft moved by a linear actuator means to slide along a center axis. A vertical position detector are provide for detecting the current position of the shaft to produce position signals indicative of detected positions. An actuation controller controls the movement of the shaft based on the position signals from the position detector.

10 Claims, 10 Drawing Sheets

1

LINEAR ACTUATING APPARATUS

BACKGROUND OF THE INVENTION

1. Field of the Invention

The present invention relates to a linear actuating apparatus for moving linearly with a well-controlled manner especially with respect to the moving speed and moving torque and, more particularly, to a semiconductor product feeding apparatus that approaches a work piece to hold and carry the work piece and, for feeding or mounting a semiconductor to an electric circuit board.

2. Description of the Prior Art

In FIG. 12, a conventional feeding head unit 1000, a linear actuating apparatus, applied for semiconductor product mounting operation is shown. This feeding head unit 1000 includes a collet 1007 having a through hole opened at the bottom and side surface thereof. A pneumatic tube 1008 having one end connected to this side opening of the collet 1007 and another end connected to an air suction unit. When the suction unit works, the collet 1007 can hold an object by the traction force acting around the bottom opening.

A first AC servo motor 1001 is used for rotating the collet 1007 about a first vertical axis Lc1 to locate the object on a desirable horizontal position above the target place. A second AC serve motor 1002 is used for moving along a second axis Lc2 and setting the collet 1007 at the desirable vertical position.

A ball screw 1003 is provided for converting the rotating torque transmitted from the second servo motor 1002 into a reciprocating motion by means of nut housed in a frame housing 1004. This reciprocating motion is utilized to move the collet 1007 in the vertical direction.

A harmonic mechanism 1005 having no backlash is provided for steplessly reducing the rotating speed transmitted by the first AC servo motor 1001. A pneumatic power inlet 1006 is provided for moving the collet 1007 to press the semiconductor product against the target place, or electric circuit board for example, to mount thereon.

When this feeding head unit 1000 moves down to catch or mount a semiconductor product, a NC control unit is used to reduce the speed of the unit 1000 in two steps to prevent the semiconductor product from being broken by a big impact with the unit 1000.

However, this feed head unit 1000 can not be compactly constructed because components are arranged along with the two axes Lc1 and Lc2, resulting in a heavier weight. Therefore, it is necessary to control the big inertia moment due to the heavier weight, making it difficult to position the unit 1000 at a correct position.

Furthermore, the combination of the ball screw and nut mechanism essentially needs grease. The dust generated from such grease may adversely influence the semiconductor product.

Furthermore, it is also impossible to judge whether the head 1000 is in contact with the object, such as semiconductor material, or not. For this purpose, the NC control should be set to control the stopping period of the AC servo motors, otherwise the semiconductor and the circuit board may be damaged.

In FIG. 13, a conventional voice coil motor is shown. The electromagnet coil C fixed to the shaft S is housed inside a stationary magnet M. Since the electric wires W for supplying energizing power are essentially connected to the coil C, the shaft S can not slide or rotate due to the wires W.

SUMMARY OF THE INVENTION

The object of the present invention is therefore to provide a linear actuating apparatus which solves these problems.

2

The present invention has been developed with a view to substantially solving the above described disadvantages and has for its essential object to provide a linear actuator means for moving a shaft means along a linear axis, a position detection the means for detecting position of the shaft means to produce a position signal; an actuation control means for controlling the linear actuator means based on the position signal.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS (First Embodiment)

Figure 1:
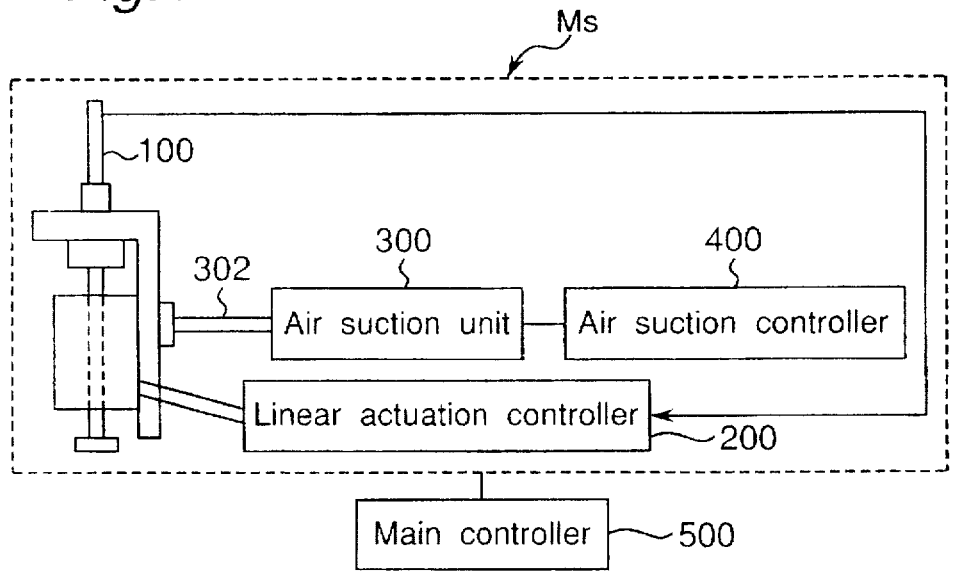
FIG. 1 is a block diagram showing a linear actuating apparatus, according to a first embodiment of the present invention, applied to a semiconductor product mounting system.

Referring to FIG. 1, a linear actuating apparatus according to a first embodiment of the present invention, applied to a semi-conductor product mounting system, is shown. The semi-conductor product mounting system Ms includes a feeding head unit 100, a linear actuation controller 200, an air suction unit 300, an air suction controller 400, and a main controller 500 for controlling the entire operation of the system.

The feeding head unit 100 is preferably set vertically above with respect to a work piece, as schematically shown in FIG. 1. The construction of the feeding head unit 100 will be described later with reference to FIG. 3. A horizontal actuating unit is provided for moving the feeding head unit 100 in the horizontal direction to approach optional positions within a horizontal plane. As such a horizontal actuation unit, an X-Y table is usually used but is not shown in FIG. 1 for the sake of brevity.

The linear actuation controller 200 is connected to the feeding head unit 100 for controlling the linear movement thereof. The construction and operation of the linear actuation controller 200 will be described specifically later with reference to FIGS. 5, 6, and 7.

The air suction unit 300 has a vacuum pump for sucking air and a vacuum ejector for exhausting the sucked air therefrom, which are not shown for the sake of brevity. The air suction unit 300 is connected to the feeding head unit 100 by a pneumatic tube 202 and to the air suction controller 400. The controller 400 controls operation of the vacuum pump and ejector so as to suck air through the top end of the feeding unit 100 to capture an object or work piece.

The main controller 500 is provided for the control of the entire operation of the semiconductor product mounting system, so that the feeding head unit 100 moves in three dimensional directions to capture and carry the aimed product to the desired position. The operation of the main controller 500 is described below with reference to FIG. 3.

Figure 2:
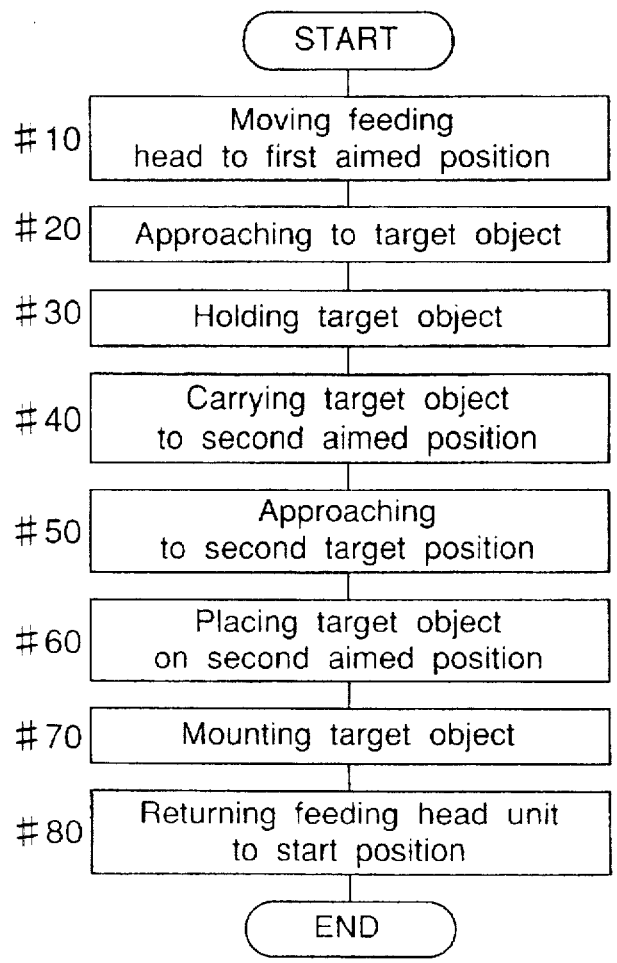
FIG. 2 is a flow chart showing the operation of the semiconductor product mounting system of FIG. 1.

Referring to FIG. 2, the operation of the main controller 500 is shown. When the operation starts, the main controller 500 controls all elements of the system return to a initial starting position. Each of blocks in FIG. 2 represents an operation routing wherein plural operations are performed.

At block #10, the main controller 500 controls the XY-actuator so as to move the feeding head 100 to a first position above the target object.

At block #20, the main controller 500 gives an object approach command to the linear actuation controller 200. Then the controller 200 controls the feeding head unit 100 to move down linearly to approach the object, or a semiconductor product for example.

At block #30, the main controller 500 gives a suction command to the air suction controller 400. Then, the controller 400 controls the air suction unit 300 to suck the air through the top end of the feeding head unit 100. Note that the air sucking operation at this block can be performed at any of previous blocks.

The main controller 500 further controls the movement of the feeding head unit 100 to be located on the object securely. Then, the feeding head unit 100 holds the object.

At block #40, the main controller 500 makes the feeding head unit 100 to move up by controlling the linear actuation controller 300 in a reversed manner at block #20. Then, the controller 500 makes the feed head unit 100 to move a second aimed position by controlling the X-Y actuator in a reversed manner at block #10. As a result, the target object is carried by the feeding head unit 100 to the first position to the second aimed position above the second target position.

At block #50, the main controller 500 makes the feeding head unit 100 move down linearly so that the target object approach the target position in a manner similar to that at block #20.

At block #60, the main controller 500 controls the linear actuation controller 200 so that the feeding head unit 100 places the target object on the second target position safely and securely. The operation of the linear actuation controller 300 is similar to that at block #30.

At block #70, the main controller 500 further controls the linear actuation controller 300 to press the target object with a predetermined load so as to mount the target object in the target position firmly.

At block #80, the main controller 500 controls all elements of the system return to the initial starting position. Then, the operation terminates. The details of operations at block #20 will be described later with reference to FIGS. 7 and 8.

Figure 3:
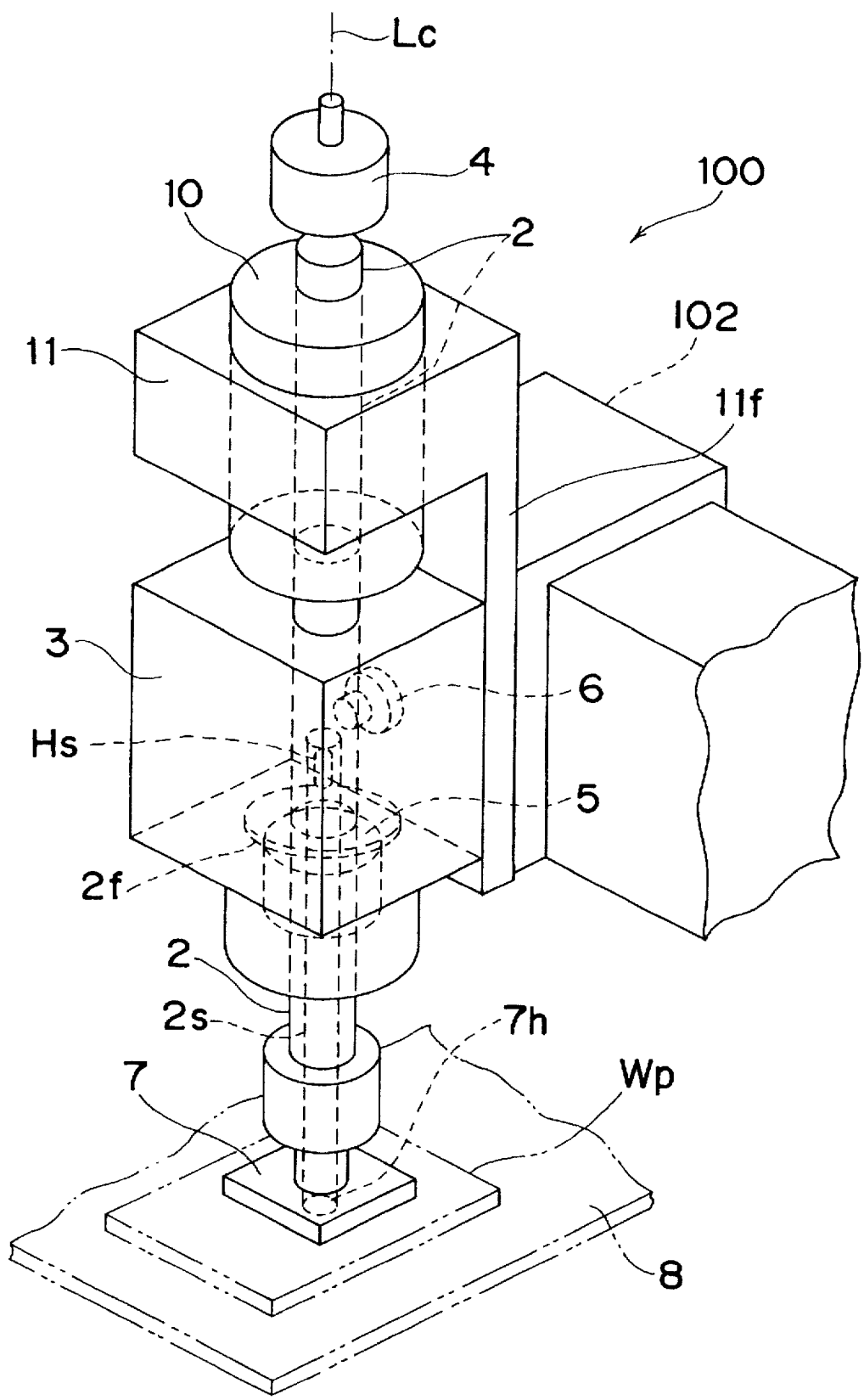
FIG. 3 is a perspective view showing a feeding head unit of the linear actuating apparatus of FIG. 1.

Referring to FIG. 3, the feeding head unit 100 is shown. The feeding head unit 100 includes a collet 7 for holding an object Wp, a shaft 2 extending along a center axis Lc, a linear actuator 3, and a ultrasonic motor 10, a harmonic speed reducer 11. The feeding head unit 100 is held by an X-Y actuator 102 that can move the unit 100 within a horizontal plane.

The collet 7 has a through hole 7h opened preferably in the center thereof. The shaft 2 has an inner space 2s opened at one end thereof and elongating inside thereof toward the other end along the center axis Lc. The collet 7 is connected to the open end of shaft 2 in a air tight manner so that the through hole 7h continues to the inner space 2s of the shaft 2.

The shaft 2 also has a side hole Hs through the circumferential side wall and communicating with the inner space 2s. Thus, the air can be taken in the shaft 2 through the opening 7h and exhausted to the outside through the side hole Hs, and vice versa. The shaft 2 has a flange 2f horizontally extending therearound at a position spaced from the collet end by a predetermined length.

The harmonic speed reducer 11 is formed in a generally thick plate-like shape. From one bottom and back side edge portion of the harmonic speed reducer 11, a flat shaped base plate 11f extends downward and substantially perpendicular to the reducer 11.

The ultrasonic motor 10 is formed in a cylindrical shape extending along the center axis Lc and is accommodated inside the harmonic speed reducer 11 such that the center axis Lc is across the main plane of the speed reducer 11 so as to be parallel to the base plate 11f.

The ultrasonic motor 10 also accommodates the shaft 2 in a slidable manner such that the shaft 2 can slide linearly along with and rotate with respect to the center axis Lc. The shaft 2 is set such that one end thereof, distal from the collet 7, extrudes by a predetermined length from the top side of the ultrasonic motor 10, as best shown in FIG. 3.

Between the ultrasonic motor 11 and the collet 7, the linear actuator 3 is provided so as to accommodate the shaft 2 therein. The shaft 2 is housed inside the linear actuator 3 in a slidable but air tight manner. The linear actuator 3 is fixed to the base plate 11f of the harmonic speed reducer 11f such that the shaft 2 can move linearly along the center axis Lc. It is to be noted that the side hole Hs remains inside the linear actuator 3.

The linear actuator 3 is formed in a rectangular box like shape having a space inside for accommodating mechanisms for linearly actuating the shaft 2 along the center axis Lc. Inside the linear actuator 3, an air outlet 6, connected to the air suction unit 300 by the pneumatic tube 302, is provided for sucking the air therein.

Above the shaft 2, a first position detector 4 is provided for precisely detecting the vertical position of the top end of the shaft 2 when the shaft 2 moves upwardly. Below the linear actuator, a second position detector 5 is provided for precisely detecting the vertical position of the shaft flange 2f when the shaft 2 moves down. It is to be noted that the position of the bottom end of the shaft 2, or the collet 7, can be determined precisely based on the detected position of the shaft flange 2f, because the distance between the flange 2f and the collet 7 is known. Note that any sensor means, suitable for detecting the existence of the shaft end or the flange, such as a proximity switch for example, can be used for the first and second position detectors 4 and 5. Thus, the first and second position detectors 4 and 5 produce a first, highest, position signal SH and a second, lowest, position signal SL, respectively.

Figure 4:
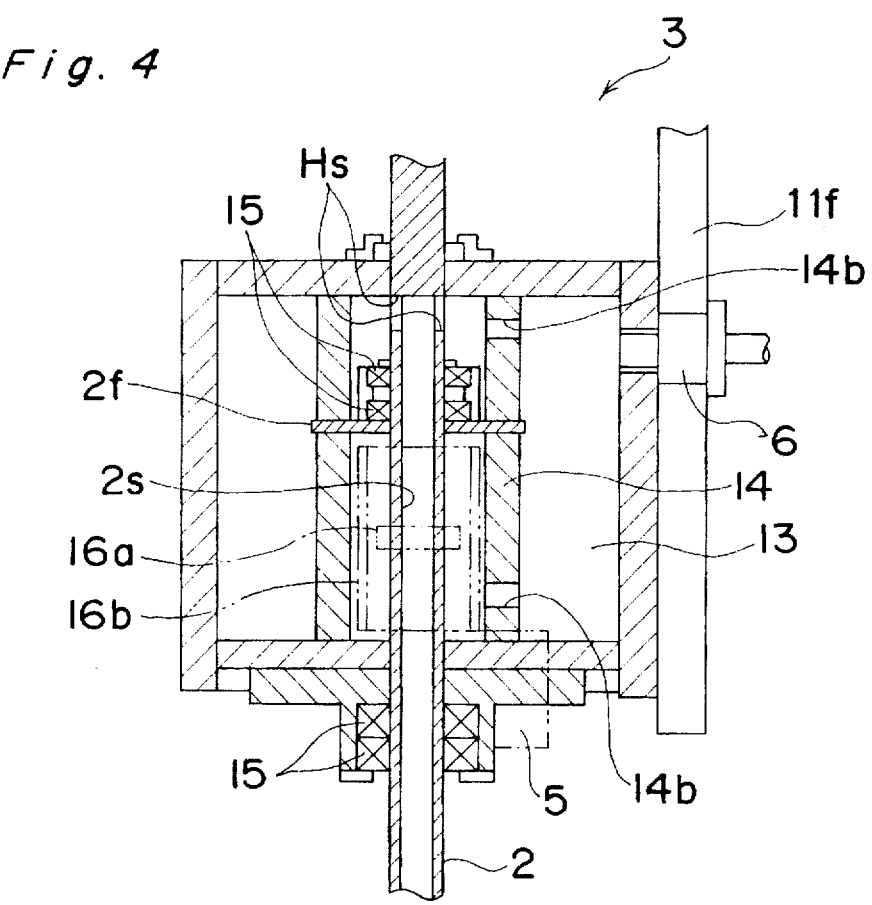
FIG. 4 is a cross sectional view showing the inside of the linear actuator of the feeding head unit of FIG. 3.

Referring to FIG. 4, the inside of the linear actuator 3 is shown. The linear actuator 3 has an inner casing 14 wherein the shaft 2 is accommodated. Plural sets of bearings are provided between the inner casing 14 and the shaft 2 for supporting the shaft 2 in a rotatable and slidable manner. The inner casing 14 has ventilating holes formed in the circumferential wall thereof to provide communication with the air inside the shaft space 2s and the air outlet 6 through the side hole Hs. Thus, an air sucking or flowing path is formed inside the linear actuator 3.

However, instead of the thus formed air communicating path, another type of air path can be formed only by extending the shaft space 2s over the top end of the shaft 2 with the side hole Hs being eliminated. In this path, the air is taken through and exhausted from the bottom end and the top end, respectively, of the shaft 2.

A stationary coil 16b is fixed inside the inner housing 14. A movable coil 16a is fixed around the shaft 2 so as to move together with the shaft 2 inside of the stationary coil 16b by an electromagnetic force acting between both coils 16a and 16b. Therefore, the moving direction and moving force of the shaft 2 are determined by the direction and amount, respectively, of the electric current flowing in the coils 16a and 16b.

The shaft 2 is connected to the linear actuator 3 and the harmonic speed reducer 11 by means of a ball spline mechanism. As a result, the shaft 2 can rotate and slide along with the center axis Lc thereof. The linear actuator 3 functions to adjust the vertical position and loading pressure of the shaft. The ultrasonic motor 10 and the harmonic speed reducer 11 form a mechanism for adjusting the rotation of the shaft 2. As described above with reference to FIG. 3, all adjusting mechanisms for the shaft 2 are assembled along with a single axis Lc.

Figure 5:
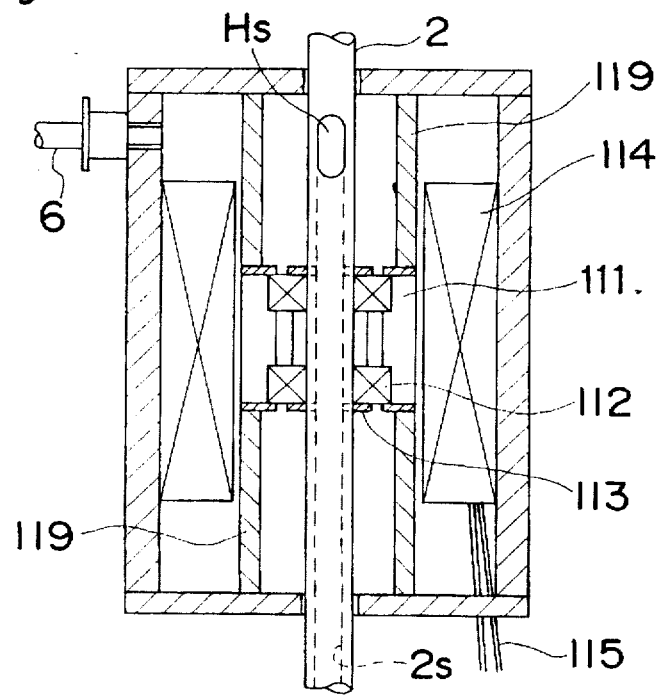
FIG. 5 is a cross sectional view showing a voice coil motor used as the linear actuator.

Referring to FIG. 5, the internal structure of a voice coil motor that is applied for the linear actuator 3 is shown. The voice coil motor has a yoke 119 at which a bearing set 112 is slidably fixed by snap rings 113 to support the shaft 2 therein. Between snap rings 113, a magnet 111 is provided.

Around the yoke 119, magnetic coils 114 are provided. Service power lines 115 are connected to the magnetic coils 14 for supplying the energizing power thereto. As described above, by adjusting the energizing power, the shaft 2 can slide freely.

Figure 6:
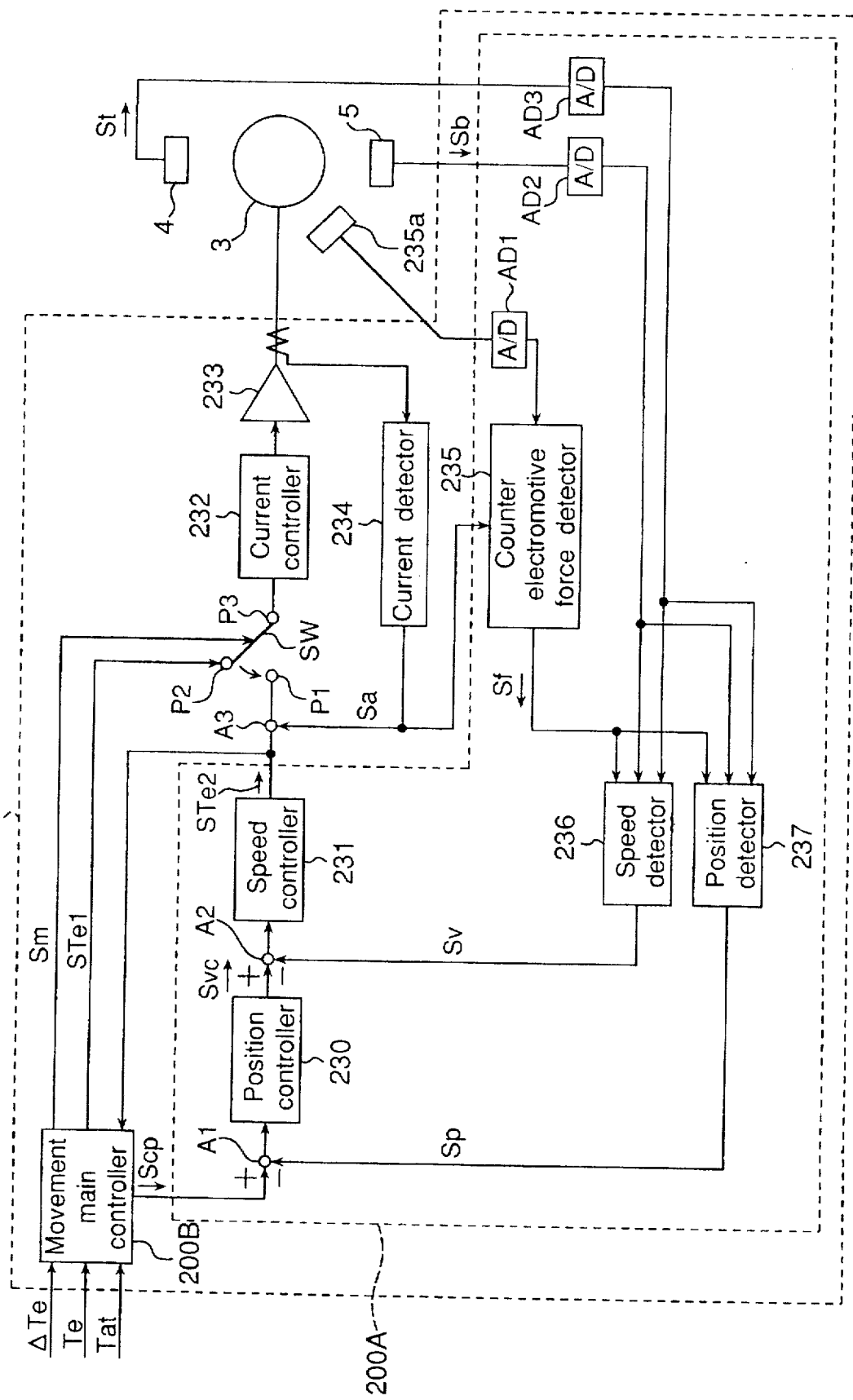
FIG. 6 is a block diagram showing a linear actuation controller of FIG. 1.

Referring to FIG. 6, details of the linear actuation controller 200 are shown. The linear actuation controller 200 mainly includes a (position control unit) movement controller 200A and a movement main controller 200B. Furthermore, a current controller 232, a power amplifier 233, a current detector 234, and a voltage sensor 235a are provided. The voltage sensor 235a is connected to the linear actuator 3 that is a linear motor for detecting a counter electromotive voltage in the linear motor 3.

The movement controller 200A is connected to an external data setting panel 101 such as keyboard device by an operator can set various parameters such as ΔTe, Te, and Tat for determining the operation mode of the actuation controller 200. However, it is also possible to determine before the operation and store such predetermined parameters in the movement main controller 200B. The method to determine these parameters ΔTe, Te, and Tat will be described later with reference to FIG. 8.

Based on such parameters as ΔTe, Te, and Tat the movement controller 200A produces a mode selection signals Sm, a first electric current command signal STe1, and a position command signal Scp so as to control the linear actuator 3 that moves the shaft 2 linearly.

The movement controller 200A includes a position controller 230, a speed controller 231, a counter electromotive force detector 235, a speed detector 236, and a position detector 237.

The current detector 234 is connected to the linear actuator 3 for detecting an electric current flowing therein to produces a current signal Sa in a digital format.

The counter electromotive force detector 235 is connected to the current detector 234 for receiving the current signal Sa therefrom. The counter electromotive force detector 235 is further connected to the voltage sensor 235a, through a first analog-to-digital convertor AD1, for receiving the detected voltage signal to produce a counter electromotive force signal Sf.

The speed detector 236 is connected to the first and second position detectors 4 and 5 through analog to digital convertors for receiving the position signals St and Sb, respectively. The speed detector 236 is further connected to the counter electromotive detector 235 for receiving the detected counter electromotive force signal Sf therefrom to produce a speed signal Sv representing the current moving speed Sv of the actuator 3, or the shaft 2. The moving speed Sv can be expressed by the following equation.

$$Sv = Sf \ K1 \qquad (1),$$

wherein "k" is a constant suitably determined.

Similarly, the position detector 237 is connected to the first and second position detectors 4 and 5, the counter electromotive detector 235 for receiving signals SH, SL, and Sf, respectively. The position detector 237 detects the current position of the actuator 3, or the shaft 2 according to the following equation (2) and produces a current position signal Sp.

$$Sp = K2 \int (Sf) dt \qquad (2),$$

wherein "K2" is a constant suitably determined.

A first adder A1 has a positive input port connected to the movement main controller 200B for receiving the position command signal Scp therefrom, and a negative input port to the position detector 237 for receiving the position signal Sp therefrom. The first adder A1 subtracts the position signal Sp from the position command signal Scp to output the result from an output terminal thereof.

The position controller 230 is connected to the output port of first adder AD1 for receiving the difference between signals Scp and Sp therefrom. Then, a speed command signal Scv is produced based on the information of the detected current position (Sp) and commanded position (Scp).

A second adder A2 has a positive input port connected to the position controller 230 for receiving the speed command signal Scv therefrom, and a negative input port connected to the speed detector 236 for receiving the speed signal Sv. The second adder A2 subtracts the detected speed Sv from the commanded speed Svc to output the result from an output port thereof.

The speed controller 231 is connected to the second adder A2 for receiving the subtraction result therefrom. Then, the speed controller 231 produces a second electric current command signal STe2 based on the information of detected current speed (Sv) and commanded speed (Svc). The output port of the speed controller 231 is connected to the movement main controller 200B for transferring the second electric current command signal STe2 thereto.

A third adder A3 has a positive input port connected to the speed controller 231 for receiving the second electric current command signal STe2 therefrom, and a negative input port connected to the current detector 234 for receiving the current signal Sa therefrom. The third adder A3 subtracts the detected current signal Sa from the second electric current command signal STe2 to output the result from an output terminal thereof.

A first terminal point P1 is connected to the third adder A3 for receiving the result therefrom. A second terminal point P2 is connected to the movement main controller 200B for receiving the first electric current command signal STe1 therefrom. A third terminal point P3 is connected to the current controller 232.

A select switch SW is connected to the movement main controller 200B for selectively connecting either one of first and second terminal points P1 and P2 to the third terminal point P3 based on the mode selection signal Sm. When the first terminal point P1 is selected, the difference between the second current command signal STe2 and the detected current signal Sa is supplied to the current controller 232. When the second terminal point P2 is selected, the first current command signal STe1 is supplied to the current controller. Thus, the operation mode of movement controller 200A is switched between the moving mode and the mounting mode, which will be described with reference to FIGS. 7, 8, and 9.

Figure 7:
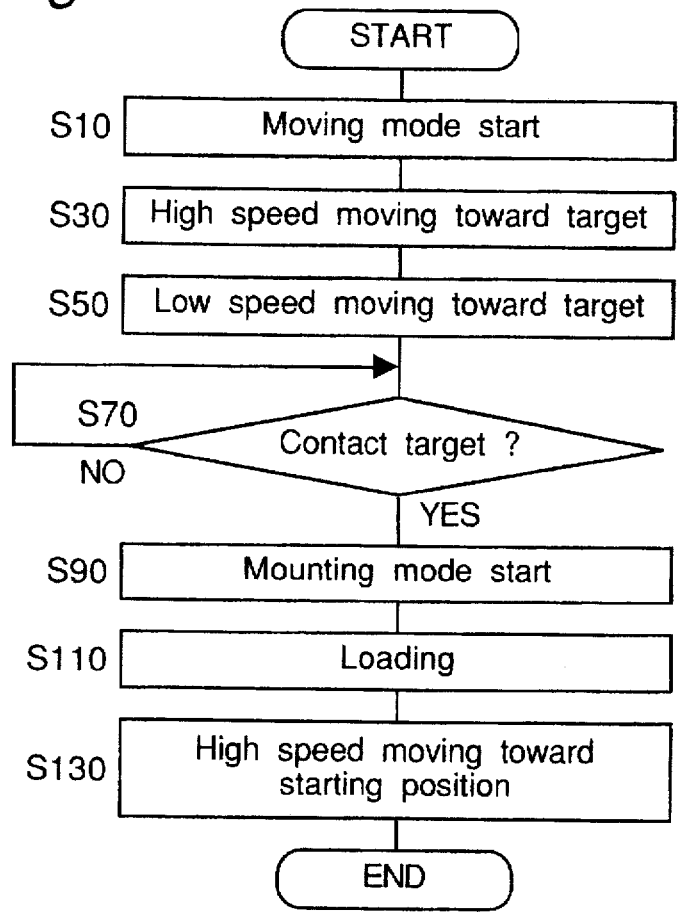
FIG. 7 is flow chart showing the operation of the linear actuation controller of FIG. 6.

Referring to FIG. 7, the operation of the linear actuation controller 200 is shown. When the semi-conductor product mounting system Ms finished to place the linear feeding unit 100 above the target object, the main controller 500 commands the actuation controller 200 to starts the operation of block #20 of FIG. 1.

At step 10, the movement main controller 200B actuate the select switch SW to select the first terminal point P1 by the mode selection signal Sm. Then, the moving mode starts.

At step S30, the movement main controller 200B places the position command signal Scp having a rising wave form. According to the position command signal Scp, the linear actuator 3 moves the linear feeding head unit 100, or the shaft 2, at high speed, as best shown in FIG. 9. The operation at this step will be further described with reference to FIG. 8. In this example, since the target object is initially placed below the feeding head unit 100, the actuator 3 moves the shaft 2 downward. Therefore, when the target object is located above the head unit 100, the shaft 2 is actuated upward.

At step S50, the position command signal Scp is set at a constant level so that the linear feeding head unit 100 moves at low speed.

At step 70, it is judged whether the shaft top 2, or the collet 7 make a contact with the target object or not, based on the current command signal STe2. Note that the current command signal STe2 fed back from the speed controller 231 to the movement main controller 200B increases when the shaft 2 is continually actuated downward against the object. Therefore, the contact is judged by the following inequality of $$STe2(n)-STe2(n-1) > Tat \qquad (3),$$

wherein (n) and (n−1) represent the present and previous control operation cycle of the actuation controller 200.

When the inequality (3) is not satisfied, it is judged that the shaft 2 is not in contact with the object. Then the procedure repeats until when the inoculate (3) is satisfied. This is because that, the shaft 2 may jump up by a shock of collision with the object. Therefore, it is judged that the shaft 2 is in contact with the object only when the pressing load corresponding to the current signal STe1 becomes greater than a threshold value Tat. Therefore, this threshold Tat is determined in consideration of the mechanical strength of the object. For example, when the object is a semi-conductor product, Tat is determined to current value corresponding to a force within a range from 50 gf to 5 Kgf, but not limited thereto. Furthermore, the linear travel of the shaft 2 moving between the top and bottom positions is preferably 40 mm, but is not so limited.

When the inequality (3) is satisfied, it is judged that the shaft 2 is in contact with the object, the procedure advances to step S90.

At step S90, the movement main controller 200B sends the mode selection signal Sm so that the select switch SW connects the second terminal point P2, instead of the first terminal point P1, to the third terminal point P3. Thus, the first current command signal STe1 is supplied to the current controller 232 during the mounting mode. Then, the mounting mode starts.

At step S110, the loading force for pressing the shaft 2 against the object is increased so as to firmly mount the object on the target location. In other words, the semiconductor product is mounted in the predetermined location on the electric circuit board.

For increasing loading force, the current command signal STe1 is increased by a predetermined gain $\Delta Te$ every control cycle. This is expressed by the following equation of $$STe1(n)=STe1(n-1)+\Delta Te \qquad (4).$$

However, when STe1(n) is greater than Te, STe1(n) is set to Te corresponding to the predetermined load in order to prevent breakage of the object. Therefore, this threshold Te is determined in consideration of the mechanical strength of the object.

When the first current command STe1 exceeds the threshold Te, it is judged that the mounting object on the target location is completed.

At step S130, the movement main controller 200B sends the mode selection signal Sm to the select switch SW so as to connect the first point P1 again. Then, the controller 200B further sends the position command signal Scp having a descending wave form so as to actuate the shaft 2, or the head unit 100, upward.

Figure 8:
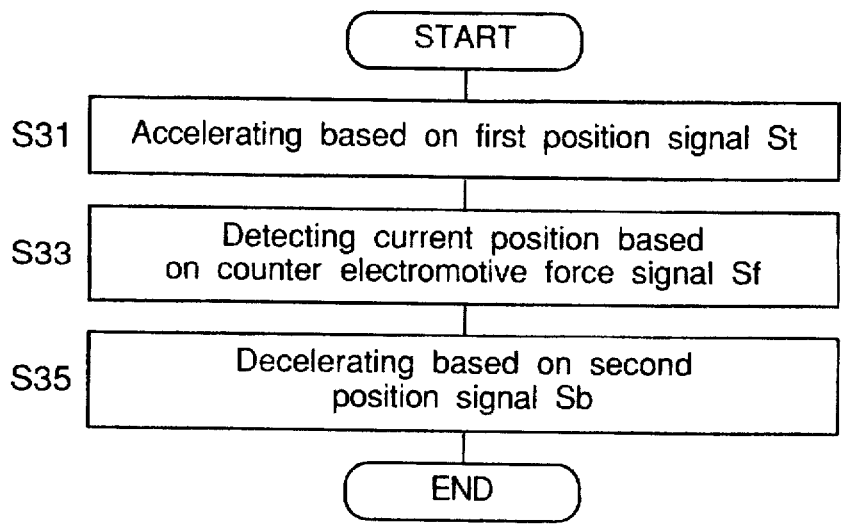
FIG. 8 is a flow chart showing individual operations at a high speed moving step of FIG. 7.
Figure 9:
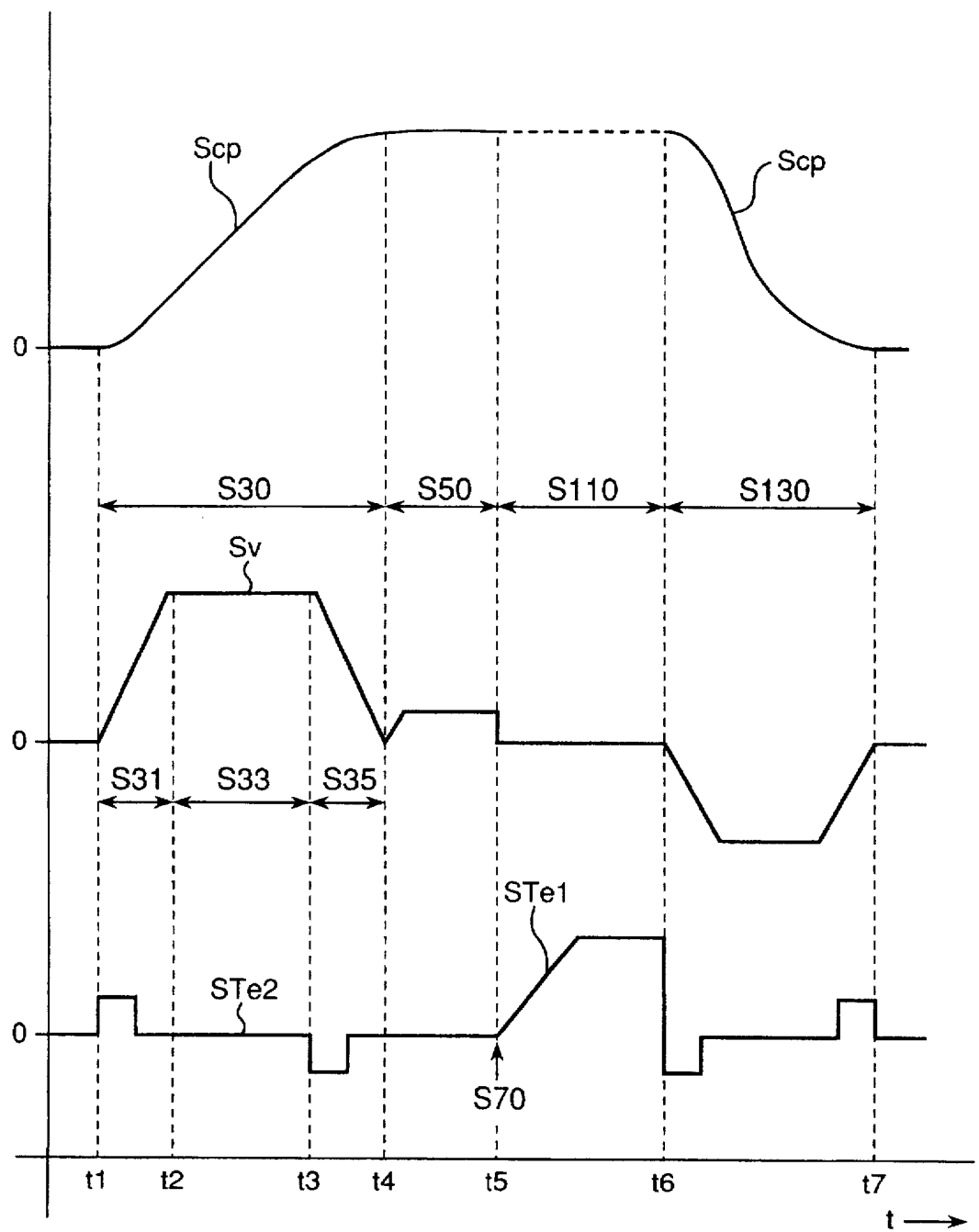
FIG. 9 is a graph for assisting with explaining the operation of the linear actuation controller of FIG. 5.

Referring to FIG. 8, the individual operations performed at the high speed moving step S30 of FIG. 7 are described more specifically. When the high speed moving starts, the shaft 2 is located at the higher position near the first position detector 4.

At step S31, the speed detector 236 and position detector 236 detect the speed Sv and position Sp based on the first position signal St from the first position detector 4.

As the shaft 2 moves downwardly away from the first position detector 4, it still have a long way until it engages the second position detector 5. In such occasions, both the position detectors 4 and 5 can not detect the position of the shaft 2. Therefore, the counter electromotive force Sf in the linear actuator 3 is used for detecting the position of shaft 2.

At step S33, the position of shaft 2, or the feeding head unit 100 can be detected based on the above described equation (2).

When the shaft end, or collet 7, reaches the second position detector 5, the speed detector 236 and position detector 236 detect the speed Sv and position Sp based on the second position signal Sb from the second position detector 5. According to these signals Sv and Sp, the actuator 3 is controlled in order to reduce the moving speed of the shaft 2.

Referring to FIG. 9, various signals Scp, Svr and STe (STe1 and STe2) observed in the linear actuation controller 200 are shown. Note that the periods from time t1 to t4, from t4 to t5, t5 to t6 and t6 to t7 correspond to steps S30, S50, S110, and S130, respectively, of FIG. 7. Furthermore, note that the periods from t1 to t2, t2 to t3, and t3 to t4 correspond to steps S31, S33, and S35, respectively, of FIG. 8. The position command signal Scp will not be produced during the period of step S110.

(Second Embodiment)

Figure 10:
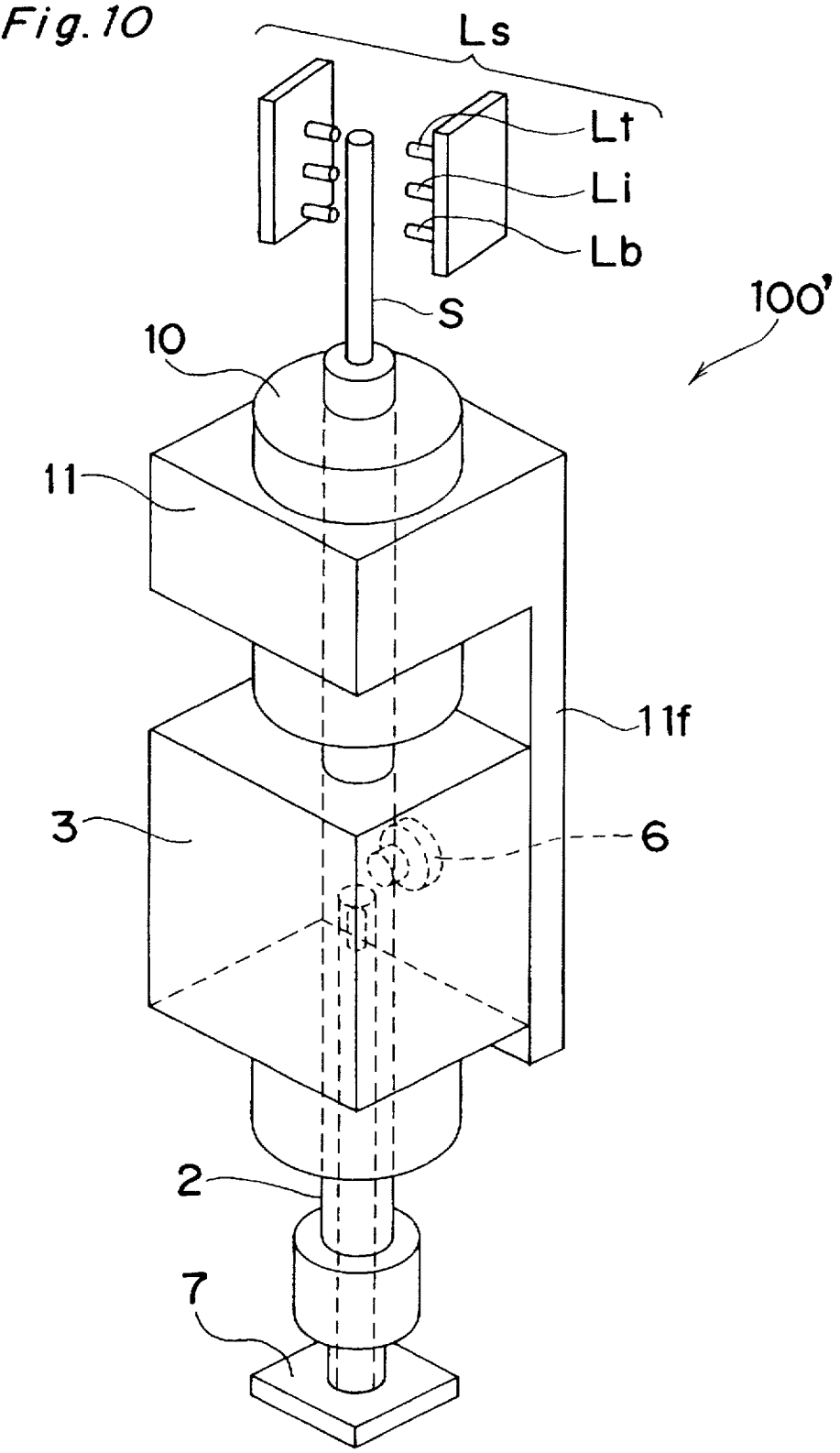
FIG. 10 is a perspective view of an alternative of the feeding head unit of FIG. 3, according to a second embodiment of the present invention.

Referring to FIG. 10, an feeding head unit, according to a second embodiment of the present invention, of FIG. 3 is shown briefly. This feeding heat unit 100' has a construction similar to that of FIG. 3. However, the first and second position detectors 4 and 5, and the shaft flange 2f in FIG. 3 are replaced by a linear scale Ls which can continually detect the position and movement of the shaft 3 over all range of movement. The linear scale Ls has a highest limit sensor Lt, a starting point sensor Li, and a lowest limit sensor Lb, as best shown in FIG. 10.

The linear scale Ls further has an elongate scale S placed to cross each of sensors Lt, Li, and Lb. According to the movent of scale S, the linear scale Ls produces the digital signal SLs indicative of the position and movement of the scale S. In this example, the scale S is connected to the top end of the shaft 2, but is not limited thereto.

Figure 11:
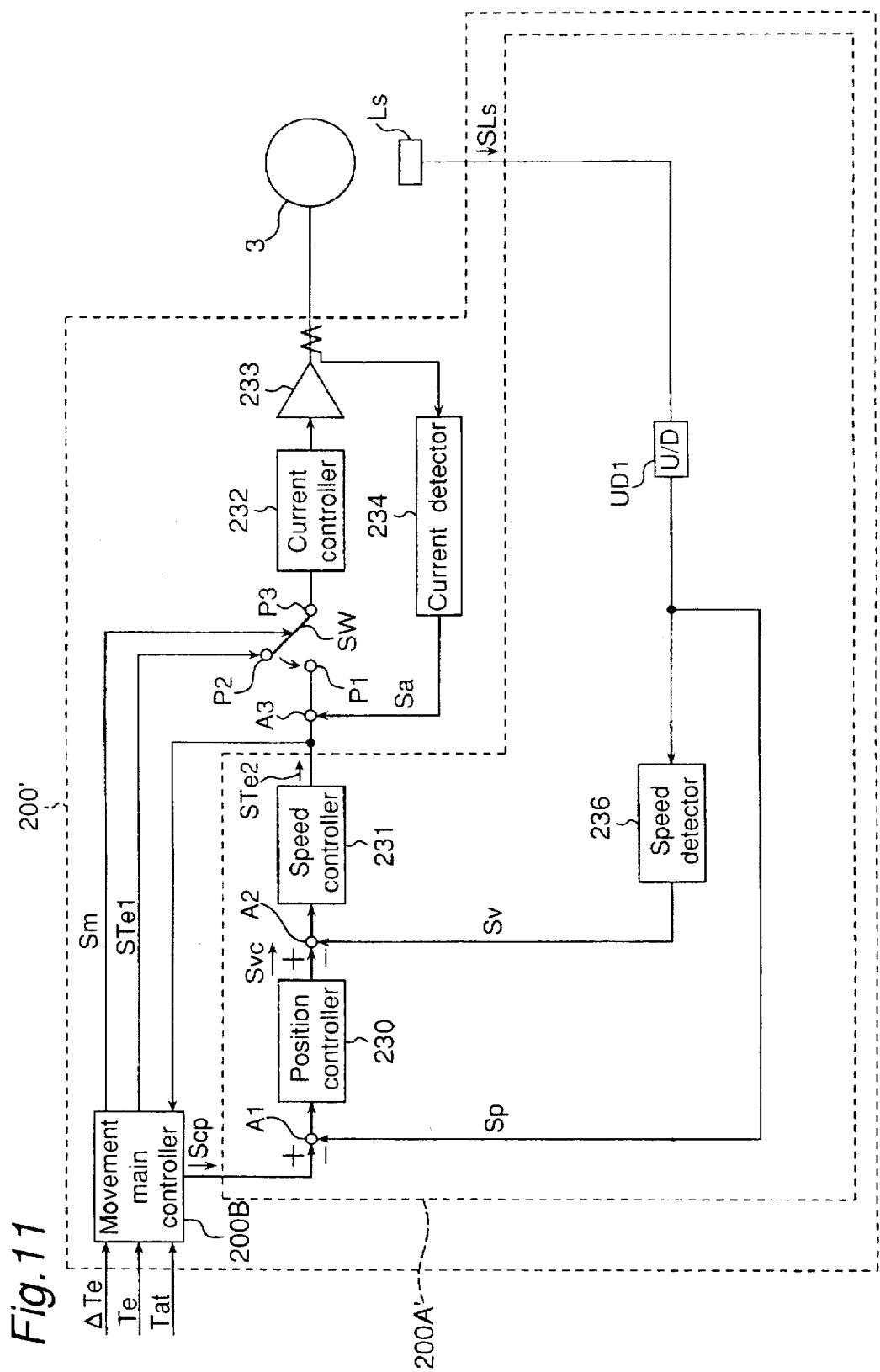
FIG. 11 is a block diagram showing an alternative of the linear actuation controller of FIG. 1, according to the second embodiment of the present invention.
Figure 12:
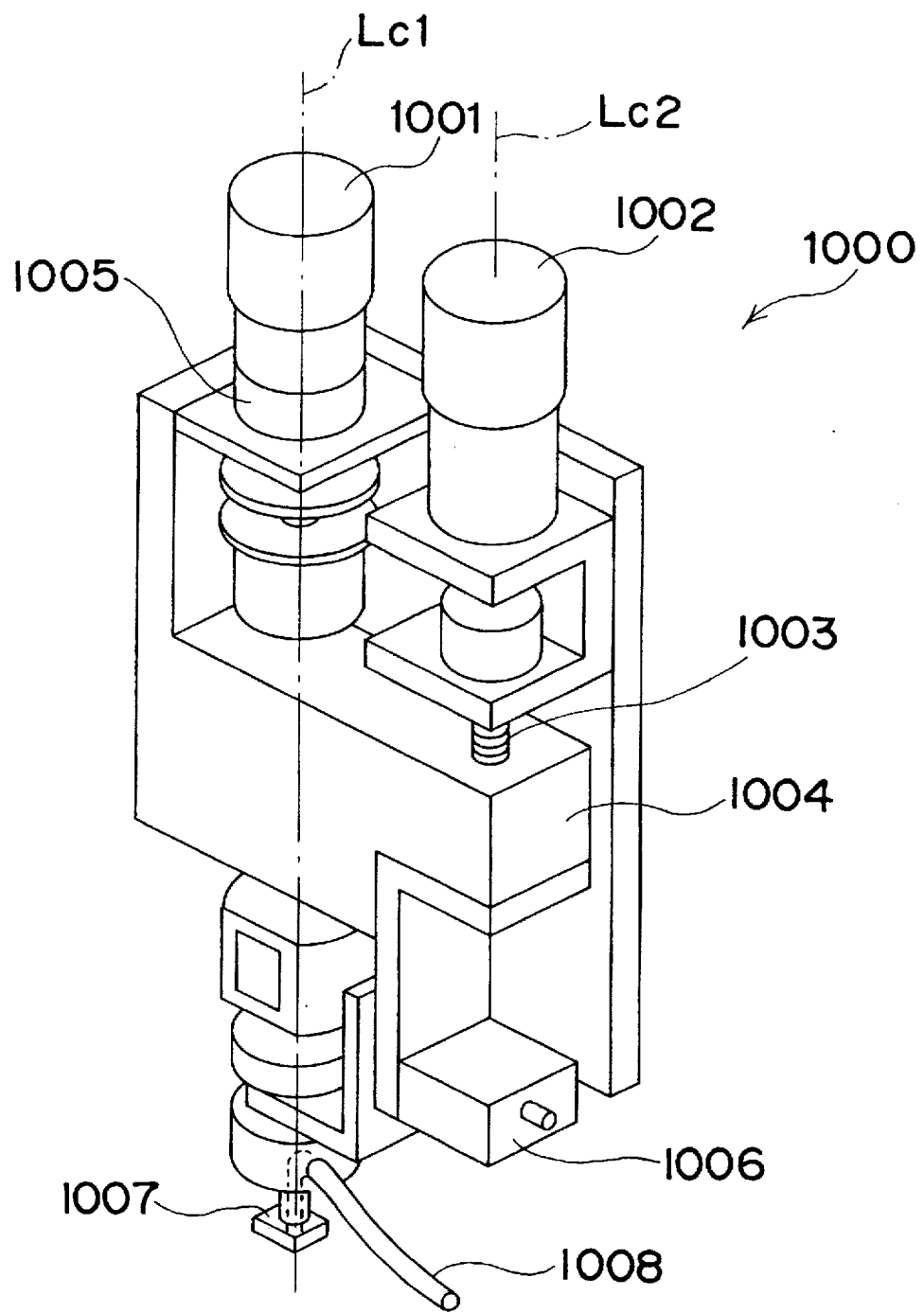
FIG. 12 is a perspective view of a conventional feeding head unit.
Figure 13:
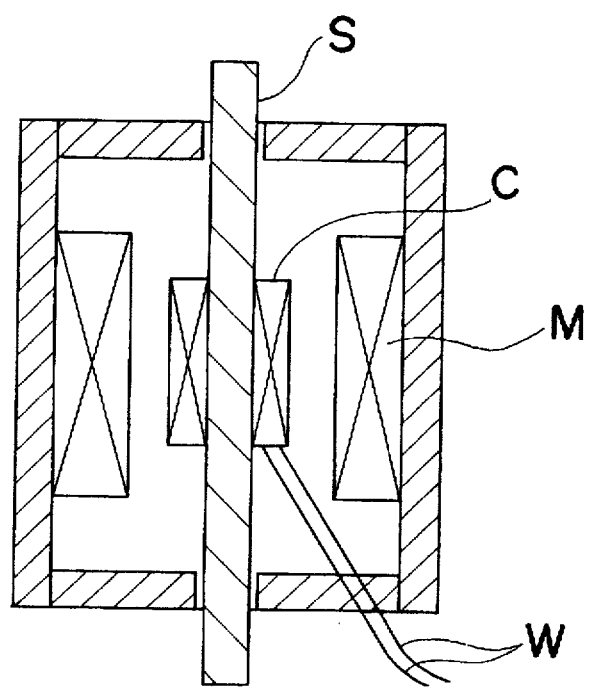
FIG. 13 is a sectional view of a conventional voice coil motor.

Referring to FIG. 11, an actuation controller 200' according to this embodiment is shown. Since the first and second position detectors 4 and 5 in FIG. 6 are replace by the linear scale Ls, components relative to these detectors are removed, as shown in FIG. 11, from a movement controller 200A'. However, a up-down counter UD1 is inserted between the linear scale Ls and the speed detector 236 for producing the position signal Sp based on the signal SLs. Then, the speed detector 236 produces the speed signal Sv based on the position signal. The operation of the actuation controller 200' is substantially the same as that of the first embodiment.

As is apparent from the above, the liner feeding unit 3 can be constructed so as to be compact and light weight, because the constructing components of unit 3 are arranged in a single axis system. As a result, the reduced manufacturing cost, lighter weight, and smaller inertia moment are obtained, enabling it to position the head unit at a desired position correctly.

Furthermore, the contacting conditions of the feeding head unit with the object, or a semiconductor product and the circuit board can be detected precisely by detecting a counter electromotive force in the linear actuator. Therefore, the movement of the linear actuator can be controlled to stop when the head unit contacts the object, securing the quality of the object. Furthermore, even if it is necessary to apply the object with a load to press against the other part (circuit board), the applying load can be controlled precisely. When a voice coil motor is used as the linear actuator, more finer or more precise control is possible.

Since there is nothing to generate dust, the object such as a semiconductor or a circuit board is not adversely affected. Still further, the combination of an ultrasonic motor and a harmonic speed reducer provides smoother reduction of rotational speed of the ultrasonic motor without backlash, increasing the precision of rotational positioning.

The air suction path can be formed inside the shaft and the linear actuator, with a pneumatic hose connected to the backside of the linear actuator. Note that the pneumatic hose connected to the shaft end is not only a hamper but also a cause for degrading the quality of control of the linear actuation.

Although the present invention has been fully described in connection with the preferred embodiments thereof with reference to the accompanying drawings, it is to be noted that various changes and modifications will be apparent to those skilled in the art. Such change and modifications are to be understood as included within the scope of the present invention as defined by the appended claims unless they depart therefrom.

What is claimed is:

1. A linear actuating apparatus comprising:

a shaft;

a linear actuator for moving said shaft along a linear axis;

a position detection means for detecting a position of said shaft and producing position signals, said position detection means comprising a first position detector for detecting a first position at which said shaft starts to move and producing a first position signal, a second position detector for detecting a second position at which said shaft stops and producing a second position signal, and a voltage sensor for detecting a position of said shaft between said first and second positions by detecting a counter electromotive force acting in said linear actuator, said voltage sensor producing a third position signal;

an actuation controller for controlling said linear actuator based on a signal from said position detection means, said actuation controller comprising a load controller for changing an actuation force to move said shaft based on said third signal, wherein said load controller increases said actuation force by a predetermined amount to a first predetermined force and said load controller stops increasing said actuation force when the difference of said third position signal between increases of said predetermined amount is greater than a predetermined value.

2. The linear actuation apparatus as claimed in claim 1, wherein said shaft is open at one end and defines an air passage communicating with said open end such that air can be sucked through said air passage to hold an object by suction at said one end of said shaft.

3. The linear actuation apparatus as claimed in claim 1, wherein said shaft is capable of rotary and sliding movement relative to a central axis of said shaft.

4. The linear actuation apparatus as claimed in claim 3, wherein said shaft is open at one end and defines an air passage communicating with said open end such that air can be sucked through said air passage to hold an object by suction at said one end of said shaft.

5. A linear actuating apparatus comprising:

a shaft having a central axis;

a linear actuator operatively coupled to said shaft for moving said shaft along said central axis, said linear actuator including a magnet fixed around said shaft and a magnetic coil surrounding said magnet, wherein said magnet and said shaft are movable together in response to an electromagnetic force generated by said magnetic coil;

a position detection means for detecting a position of said shaft and producing position signals, wherein said position detection means comprises:
 a first position detector for detecting a first position of said shaft and producing a first position signal;
 a second position detector, for detecting a second position of said shaft and producing a second position signal; and
 a third position detector, wherein said third position detector comprises a voltage sensor for detecting a counter electromotive force acting in said linear actuator for detecting a third position of said shaft and producing a third position signal, said third position being between said first and second positions; and
 an actuation controller operatively coupled to said linear actuator so as to control said linear actuator based on a position signal from said position detection means,
wherein said actuation controller comprises a load controller for changing a shaft movement actuation force based on said third position signal and increasing said shaft movement actuation force by a predetermined amount to a first predetermined force, and said load controller stops increasing said shaft movement actuation force when said third position signal is greater than a predetermined value.

6. A linear actuating apparatus comprising:
a shaft having a central axis, wherein said shaft is open at one end and defines an air passage communicating with said one end, such that air can be sucked through said air passage of said shaft to hold an object at said one end of said shaft by suction;
a linear actuator operatively coupled to said shaft for moving said shaft along said central axis,
said linear actuator including a magnet fixed around said shaft and a magnetic coil surrounding said magnet, wherein said magnet and said shaft are movable together in response to an electromagnetic force generated by said magnetic coil;
a position detection means for detecting a position of said shaft and producing position signals; and an actuation controller operatively coupled to said linear actuator so as to control said linear actuator based on a position signal from said position detection means.

7. A linear actuating method for controlling a linear actuation apparatus, said method comprising:
detecting a first position at which a shaft, accommodated in a linear actuator, starts to move the shaft;
producing a first position signal indicative of said detected first position;
detecting a second position at which said linear actuator stops;
producing a second position signal indicative of said detected second position;
detecting a third position between said first and second positions based on a counter electromotive force acting in said linear actuator;
producing a third position signal indicative of said detected third position;
controlling an actuating force of said linear actuator based on said position signals;
changing an actuation load based on said third position signal by increasing an actuation force by predetermined amounts to a first predetermined force; and
preventing an increase of said actuation force when said third position signal, between increases of said actuation force by said predetermined amount, is greater than a predetermined value.

8. The linear actuating method as claimed in claim 7, wherein said shaft is open at one end and defines an air passage communicating with said one end, such that air can be sucked through said shaft air passage to hold an object by suction at said one end of said shaft.

9. The linear actuating method as claimed in claim 7, wherein said shaft is capable of rotary and sliding movement with respect to a central axis of said shaft.

10. The linear actuating method as claimed in claim 9, wherein said shaft is open at one end and defines an air passage communicating with said one end, such that air can be sucked through said shaft air passage to hold an object by suction at said one end of said shaft.

* * * * *